(12) United States Patent
Herman

(10) Patent No.: US 9,542,691 B1
(45) Date of Patent: Jan. 10, 2017

(54) SYSTEM AND METHOD FOR SECURELY MANAGING DELIVERY AND REDEMPTION OF LOCATION-BASED INCENTIVES AND CUSTOMER LOYALTY REWARDS TO MOBILE DEVICES

(75) Inventor: Ronald Duane Herman, Atlanta, GA (US)

(73) Assignee: SIONIC MOBILE CORPORATION, Atlanta, GA (US)

( * ) Notice: Subject to any disclaimer, the term of this patent is extended or adjusted under 35 U.S.C. 154(b) by 840 days.

(21) Appl. No.: 12/893,227

(22) Filed: Sep. 29, 2010

Related U.S. Application Data

(60) Provisional application No. 61/326,698, filed on Apr. 22, 2010.

(51) Int. Cl.
 G06Q 30/00 (2012.01)
 G06Q 30/02 (2012.01)
(52) U.S. Cl.
 CPC .................. *G06Q 30/0226* (2013.01)
(58) Field of Classification Search
 USPC .............. 705/28, 27.1, 1.1, 14.4, 64, 7.12, 14.33,705/5, 14.3, 14.27, 14.28, 14.278; 707/200, 707/802, E17.044, 999.2, 804, 812, E17.045; 455/569.2; 379/114.12, 114.13; 704/14.3, 704/0.31
 See application file for complete search history.

(56) References Cited

U.S. PATENT DOCUMENTS

| | | | |
|---|---|---|---|
| 5,948,040 A * | 9/1999 | DeLorme et al. | 701/426 |
| 6,289,318 B1 | 9/2001 | Barber | |
| 7,617,136 B1 * | 11/2009 | Lessing et al. | 705/28 |
| 8,027,873 B2 * | 9/2011 | Drefs | G06Q 30/02 705/14.27 |
| 2002/0059101 A1 * | 5/2002 | Ratliff et al. | 705/14 |
| 2002/0077744 A1 * | 6/2002 | Nakamura | 701/202 |
| 2003/0078836 A2 * | 4/2003 | Ratliff et al. | 705/14 |
| 2003/0191725 A1 * | 10/2003 | Ratliff et al. | 705/400 |
| 2005/0043992 A1 | 2/2005 | Cohagan et al. | |
| 2006/0111941 A1 * | 5/2006 | Blom | 705/2 |
| 2006/0271436 A1 | 11/2006 | Aubertin et al. | |

(Continued)

OTHER PUBLICATIONS

The relationship between loyalty program and customer loyalty in retail industry: A case study Zakaria, Ibrahim; Rahman, Baharom Abdul; Othman, Abdul Kadir; Innovation Management and Technology Research (ICIMTR), 2012 International Conference on; Topic(s): Communication, Networking & Broadcasting ; Components, Circuits, Devices & Systems.*

(Continued)

*Primary Examiner* — Cuong H Nguyen
(74) *Attorney, Agent, or Firm* — Meunier Carlin & Curfman LLC

(57) ABSTRACT

A plurality of credentials is retrieved for a user by a computing device, wherein each of the plurality of credentials is associated with a loyalty program. For each loyalty program, itinerary data is retrieved from a server associated with the loyalty program using the credentials associated with the loyalty program from the plurality of credentials. The retrieved itinerary data retrieved for each of the loyalty programs is aggregated into an itinerary. The itinerary is presented to the user at the computing device. Loyalty points may be awarded to a user based on interaction with an application running on the computing device where the loyalty points may be redeemed for goods and services. Advertisers may be provided compensated based on the redemption of the loyalty point by users at their physical or virtual stores.

18 Claims, 7 Drawing Sheets

(56) References Cited

U.S. PATENT DOCUMENTS

| | | | |
|---|---|---|---|
| 2006/0271552 A1* | 11/2006 | McChesney et al. | 707/10 |
| 2007/0038503 A1* | 2/2007 | Krajcev et al. | 705/10 |
| 2007/0039024 A1* | 2/2007 | Krajcev et al. | 725/46 |
| 2007/0118426 A1* | 5/2007 | Barnes, Jr. | 705/14 |
| 2007/0198432 A1* | 8/2007 | Pitroda et al. | 705/64 |
| 2008/0014917 A1* | 1/2008 | Rhoads et al. | 455/422.1 |
| 2008/0120129 A1* | 5/2008 | Seubert et al. | 705/1 |
| 2009/0055271 A1* | 2/2009 | Drefs | G06Q 30/0226 705/14.27 |
| 2009/0172035 A1* | 7/2009 | Lessing et al. | 707/104.1 |
| 2009/0254971 A1* | 10/2009 | Herz et al. | 726/1 |
| 2009/0265552 A1* | 10/2009 | Moshir et al. | 713/168 |
| 2010/0069035 A1* | 3/2010 | Johnson | 455/404.1 |
| 2010/0094690 A1 | 4/2010 | Beal | |
| 2010/0174727 A1* | 7/2010 | Zappacosta et al. | 707/754 |
| 2010/0280896 A1 | 11/2010 | Postrel | |
| 2010/0312586 A1* | 12/2010 | Drefs | G06Q 10/02 705/5 |
| 2011/0029364 A1 | 2/2011 | Roeding et al. | |
| 2011/0087530 A1 | 4/2011 | Fordyce et al. | |
| 2011/0270712 A1* | 11/2011 | Wood et al. | 705/27.1 |
| 2011/0313837 A1 | 12/2011 | Katz et al. | |
| 2012/0290375 A1 | 11/2012 | Truong et al. | |

OTHER PUBLICATIONS

Who is the adopter? organizational acceptance of customer loyalty programs in supermarket chains and the potential role of a community of practice;Perez, P.D.;Engineering Management Conference, 2003. IEMC '03. Managing Technologically Driven Organizations: The Human Side of Innovation and Change.*

Evaluating the impact of a loyalty program: A case study in automobile industry; Kwang-Jae Kim; Hyun-Jin Kim; Ryeok-Hwan Kwon;Service Systems and Service Management (ICSSSM), 2010 7th International Conference on Topic(s): Computing & Processing (Hardware/Software); Digital Object Identifier: 10.1109/ICSSSM.2010.5530253 Publication Year: 2010.*

Exploring Contracts with Options in Loyalty Reward Programs Supply Chain; Yuheng Cao; Nsakanda, A.L.; Diaby, M.; Shaobo Ji; Hine, M.J.; System Science (HICSS), 2012 45th Hawaii International Conference on; Topic(s): Communication, Networking & Broadcasting ; Components, Circuits, Devices & Systems ; Computing & Processing (Hardware/Software) i.*

"Mind the Gap"—How to Manage Growth of Customer's Expectations; Oleg Ridchenko; Software Engineering Conference (CEE-SECR), 2010 6th Central and Eastern European; Year: 2010; pp. 151-155, DOI: 10.1109/CEE-SECR.2010.5783167.*

* cited by examiner

US 9,542,691 B1

SYSTEM AND METHOD FOR SECURELY MANAGING DELIVERY AND REDEMPTION OF LOCATION-BASED INCENTIVES AND CUSTOMER LOYALTY REWARDS TO MOBILE DEVICES

CROSS-REFERENCE TO RELATED APPLICATION

The present application claims priority to U.S. Provisional Application No. 61/326,698, filed Apr. 22, 2010, and entitled, "System and Method for Securely Managing Delivery and Redemption of Location-Based Incentives and Customer Loyalty Rewards to Mobile Devices," the disclosure of which is incorporated herein by reference in its entirety.

BACKGROUND

Customers have many options as to which products and services they choose to spend their money on. For example, travelers can choose from a variety of airlines, hotels, and rental car companies to use on any given trip. Based in part on the rise of the Internet, customers are able to quickly determine the products and services having the best price. Therefore, it is important for a company to develop customer loyalty to attract and retain customers if they are unable or unwilling to provide their product or service at or below the price offered by their competitors.

One popular way that companies have developed to improve customer retention is through loyalty or incentive based programs, where customers earn reward points for purchasing the services or products offered by a company. Such loyalty programs are commonly used by airlines and hotels to reward frequent flyers or hotel guests. Loyalty programs are often popular among business travelers who are often reimbursed for the cost of the hotel or flight, but are permitted to retain any rewards earned.

While these loyalty programs are effective, they may be difficult to manage for users. For example, a business traveler may use a website affiliated with their preferred airline to book a flight for a business trip, a second website affiliated with their preferred hotel to book a hotel room for the business trip, and yet another website affiliated with their preferred rental car company to book a car for the trip. The total corpus of information concerning the user's trip is now stored across the three different websites forcing the user to log into each separate websites to retrieve desired information about the trip. For example, if the user forgets the address of their rental car location, they have to log into the website of the rental car company, or if the user needs the phone number of their hotel they have to log into the website of their hotel. Even with advanced technologies such as smart phones, accessing the disparate sources may be time consuming and frustrating.

SUMMARY

In an implementation, a plurality of credentials is retrieved for a user by a computing device, wherein each of the plurality of credentials is associated with a loyalty program. For each loyalty program, itinerary data is retrieved from a server associated with the loyalty program using the credentials associated with the loyalty program from the plurality of credentials. The retrieved itinerary data retrieved for each of the loyalty programs is aggregated into an itinerary. The itinerary is presented to the user at the computing device.

Implementations may include some or all of the following features. A request may be received from the user to schedule an event, and the event may be added to the itinerary. The itinerary may include a plurality of events in an order and each event may include a time and a location. A current location of the user may be determined. A next event in the itinerary may be determined according to the order. Directions from the current location to the location of the next event may be determined, and may be presented to the user. The time of the next event may be determined. A travel time for the user to travel to the location of the next event from the current location may be determined. If the difference between the time of the next event and a current time is less than a sum of the travel time and a threshold, a recommendation that the user travel to the next event may be made. A current location of the user may be determined. Whether the current location of the user satisfies at least one location criteria of an advertising campaign may be determined, and if so, an advertisement may be displayed to the user.

Indicators of a plurality of reward items may be retrieved. Representations of the plurality of reward items may be presented to the user. Each reward item may have an associated cost in reward points. An indication of a selection of one of the plurality of reward items may be received. A reward points balance associated with the user may be determined. The reward points balance associated with the user may be debited by the cost associated with the selected reward item, and the reward item may be provided to the user. Providing the reward item to the user may include retrieving an email address associated with the user and emailing the reward item to the user at the retrieved email address. The reward item may be one of a coupon and a gift certificate. Providing the reward item to the user may include displaying a representation of the reward item on a display of the computing device. The representation may include a machine readable graphic that may be presented to a merchant associated with the reward item to facilitate redemption of the reward item by the user. The computing device may be one of a cellular phone, a smart phone, laptop computer, and a tablet computer.

In an implementation, a plurality of reward points is stored for a user by a software application of a computing device. The plurality of reward points are incremented based on user interactions by the software application of the computing device. An indication of a selection to one of a plurality of reward items is received by the software application of the computing device. Each reward item has an associated cost in reward points. The reward points balance associated with the user is debited by the cost associated with the selected reward item by the software application. The reward item is provided to the user by the software application of the computing device.

Implementations may include some or all of the following features. Each of the plurality of reward items may be associated with a merchant. Providing the reward item to the user may include retrieving an email address associated with the user and emailing the user the selected reward item. Providing the reward item to the user may include displaying a representation of the reward item on a display of the computing device. The representation may include a machine readable graphic that may be presented to a merchant associated with the reward item to facilitate redemption of the reward item by the user. The computing device may be one of a smart phone, laptop computer, or a tablet computer.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
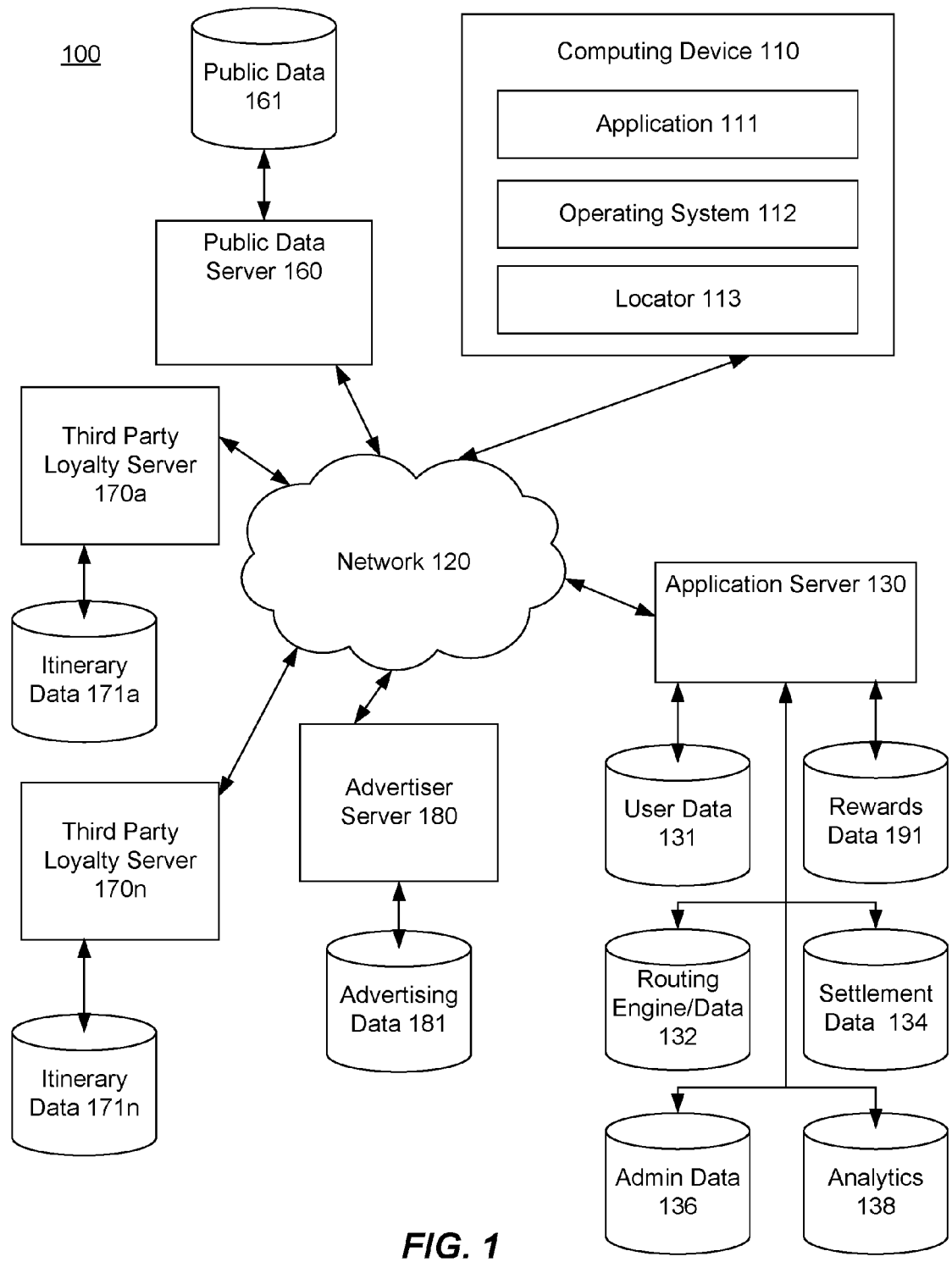
FIG. 1 is an illustration of an example environment for the use of an application.

FIG. 1 is an illustration of an example environment 100 for the use of an application 111. The application 111 may be executed on one or more computing devices 110. In some implementations, the application 111 may aggregate travel itinerary and scheduling data from a variety of sources and provide them to a user at the computing device 110. In addition, the application 111 may provide one or more reward points or incentives to the user for interacting with the application 111. These reward points may be redeemable for reward items such as products, coupons, and gift certificates offered by one or more advertisers or merchants affiliated with the application 111, for example.

As described above, the environment 100 may include a computing device 110. The computing device 110 may include a variety of computing devices including, but not limited to, cellular phones, personal digital assistants, video game devices, audio and video players, watches, laptops, or any other type of computing device. In some implementations, the computing device 110 may be a smart phone such as an iPhone, for example. An example computing device 110 is the computing device 600 illustrated in FIG. 6, for example.

As illustrated in FIG. 1, the computing device 110 includes an operating system 112. The operating system 112 may execute the application 111, for example. A wide variety of operating systems 112 may be supported. In implementations where the computing device 110 is a mobile device such as a smart phone, the operating system 112 may be a mobile OS such as Android, WebOS, iOS, Blackbery OS, or Windows Mobile, for example. The application 111 may be made available to the computing device 110 through an application 111 marketplace such as the Apple App Store or the Android Marketplace, for example.

Alternatively or additionally, the application 111 may be downloaded from a server, such as an application server 130.

The computing device 110 may further include a locator 113. The locator 113 may be a component of the computing device 110 that determines the location of the computing device 110. In some implementations, the locator 113 may be a GPS device. Other types of devices may also be used. For example, the locator 113 may determine the location of the computing device 110 using cellular phone signal information (e.g., distance from cellular towers) or Wi-Fi signal information (e.g., distance from Wi-Fi hotspots having a known location). Any system, method, or technique for determining a location may be used.

In some implementations, the application 111 may receive the location of the computing device 110 from the locator 113. The location may be provided directly to the application 111 by the locator 113, or indirectly through the operating system 112. As will be described further below, the application 111 may use the location of the computing device 110 to provide location specific information such as directions to a scheduled event or destination, or to provide targeted advertisements, for example.

The application 111 executing on the computing device 110 may interface with one or more application servers 130 through a network 112. The network 112 may be implemented using a variety of network types including, but not limited to a cellular data network (e.g., EDGE, 3G, 4G, etc.), a public switched network, or a packet switched network (i.e., the Internet). Any one of a variety of network types and technologies may be used for the network 112.

In some implementations, the application server 130 may store and/or maintain user data 131. The user data 131 may be a database with a unique record for each user associated with an application 111. Each record may include information about the user such as a unique user identifier, a name associated with the user and other information such as user address, phone number, email address, etc. A record for a user may be established when a user installs or first executes the application 111 on their computing device 110. For example, when the user installs the application 111 the user may be prompted to enter their name and address and to select a user name. A corresponding record may then be created in the user data 131 of the application server 130. Alternatively or additionally, some or all of the user data 131 may also be stored at the computing device 110. The user data 131 may also include information regarding a user's loyalty programs (e.g., airline frequent flier programs, hotel programs, car rental programs, etc.).

In some implementations, the application 111 may be a travel or business application that presents aggregated itinerary data for a user from a variety of third party sources. The sources may include public data sources (e.g., Airport departure and arrival databases, road traffic information, airport security line wait times, etc.) and third party loyalty programs (e.g., airline frequent flyer programs, hotel loyalty programs, rental car loyalty programs, etc.). For example, the application 111 may present aggregated itinerary data pertaining to a user including rental car information associated with the user, airline flight information associated with the user, and hotel information associated with the user. With respect to the private information, the information may be collected and aggregated from loyalty accounts associated with the user, or travel related websites such as Orbitz or Travelocity, for example. The information may be collected and aggregated into what is referred to herein as an itinerary for the user.

To facilitate the travel application described above, the application 111 may collect credential information from the user for each loyalty account associated with the user. For example, as part of the installation process, the user may provide credential information such as account numbers. The credential information may further include login information such as user names and passwords used for the various accounts. The various account and login information entered by the user may be provided to the application server 130 by the application 111 and stored in the user data 131. Alternatively or additionally, the information may be stored locally by the application 111.

In some implementations, each loyalty account associated with the user may have a corresponding third party loyalty server 170a, 170n (referred to herein as "third party loyalty server 170") where itinerary data 171a, 171n (referred to herein as "itinerary data 171") associated with the user may be made available to the application 111 through the network 112. Although two third party loyalty servers are shown in FIG. 1 as an example, it should be understood that more than two third party loyalty servers can be provided. The application 111 (or the application server 130) may use the credential information associated with a third party loyalty server 170 to retrieve the itinerary data 171 associated with the user.

For example, a rental car company associated with the user may maintain a third party loyalty server 170. The application 111 may connect to the third party loyalty server 170 using the credentials supplied by the user and retrieve the itinerary data 171 associated with the user. The itinerary data 171 may include information regarding a recent rental car reservation that was made by the user including dates, car model, and rental car agency phone number and address. In another example, the third party loyalty server 170 may be associated with an airline rewards program and the itinerary data 171 may include ticket information such as travel dates, departure and arrival times, airport names and addresses, and gate identifiers.

With respect to the public data, each public data source may have a corresponding public data server 160 where public data 161 is made available to the application 111. The public data 161 may include a variety of public data that is available and may be useful or relevant to a user depending on itinerary data 171 collected for the user. For example, public data 161 may include airport flight arrival and departure information, estimated security wait time for an airport, and traffic information. In some implementations, the application 111 and/or application server 130 may access information for a variety of public data servers 160, and, depending on an itinerary associated with the user, collect and aggregate public data 161 that is relevant to the itinerary.

The application 111 and/or application server 130 may retrieve the itinerary data 171 and public data 161 periodically at fixed intervals, or at the request of the application 111. For example, the application 111 may query the third party loyalty servers 170 once a day, or may query the third party loyalty servers 170 only when the user selects a user interface element of the application 111. While only one third party loyalty server 170 and one public data server 160 are shown, it is for illustrative purposes only; there is no limit to the number of third party loyalty servers 170 or public data servers 160 that may be supported by the environment 100.

The environment 100 may further include an advertiser server 180. The advertiser server 180 may provide one or more advertisements from advertising data 181 to the application 111 and/or to the application server 130 for delivery to the application 111. The advertisements may then be displayed by the application 111 to the user. In some implementations, the advertisements may be part of one or more advertising campaigns generated by one or more advertisers for the application 111.

In some implementations, the advertisements may be displayed by the application 111 to a user when one or more criteria associated with an advertising campaign are fulfilled. The criteria may include location based criteria. For example, an advertiser associated with a restaurant may generate an advertising campaign for the restaurant through a graphical user interface (GUI) that interfaces with the advertiser server 180. The advertiser may generate an advertisement for the restaurant and a condition for display of the advertisement is being within a mile of the restaurant. The advertisements and criteria may be stored in the advertising data 181. The application 111 may then display the advertisement to the user when the user is within a mile of restaurant as determined by the locator 113, for example. Other criteria may be used for an advertisement campaign such as demographic information associated with the user, or key words associated with an itinerary, for example.

In some implementations, the application server 130 may provide one or more tools through which the advertisers may create their campaigns. The advertisers may provides the various criteria for their campaign, and provide one or more advertisements from the advertising data 181 for use in the campaign using the provided tools.

In some implementations, the application 111 and or/the application server 130 may store and maintain what are referred to herein as reward points for each user. The reward points are an incentive for the users to interact with, and user various features of, the application 111 and may be stored in the rewards data 191. The interactions that qualify for reward points and/or the amount of reward points awarded for each interaction may be set by a user or administrator. For example, in some implementations, users may receive points each time they open the application 111 on their computing device 110, or may only receive points when they aggregate itinerary data 171.

The application 111 may further allow users to redeem accumulated reward points on what are referred to herein as reward items. The reward items may be provided by one or more advertisers using one or more reward campaigns similarly to the advertising campaigns. The application server 130 may similarly provide tools through which the advertisers may create the reward items and corresponding reward campaigns. Examples of reward items may include coupons, and gift certificates. Other types of reward items may be used.

In some implementations, a user may browse one or more available reward items using the application 111. The particular reward items displayed may be based on the number of reward items that the user has, as well as the active reward campaigns. For example, an advertiser or merchant may specify in a reward campaign that a reward item of a coupon for their restaurant only be available for purchase by users in particular locations.

The user may select a reward item and the reward points associated with the reward item may be debited from the reward points associated with the user by the application 111. The reward item may be provided to the user via email, for example.

Alternatively, the reward item may be displayed on the screen of the computing device 110 by the application 111. The user may then present the computing device 110 to a merchant to redeem the item. For example, the user may receive 10% of a purchase by presenting the display computing device 110 to a merchant. The merchant may view the displayed reward item and credit the user the discount on their purchase. In addition, the application 111 may display a code to the merchant. The merchant may enter the code into their point of sale terminal and the discount may be applied for the user.

In some implementations, to prevent fraud, the application 111 may use one or more validation techniques when a user selects a reward item. In one implementation, the user may be presented with an image that includes a number or code. The user may then be asked to input the included number or code to redeem the reward item. Such a visual validation system may prevent automated methods for redeeming reward items.

In implementations where the application 111 displayed the reward item on the display of the computing device 110, the application 111 may request a validation code from the merchant or advertiser when the reward item is accepted. The code may then be entered by the user or merchant and used to validate the reward and set in motion any accounting processes for the merchant and/or application server 130.

In some implementations, the application server 130 may allow merchants or advertisers to accumulate rewards points from rewards items redeemed by users for reward items provided by the merchants or advertisers. For example, when a user redeems 10 rewards points for a coupon from a merchant, the merchant may be credited with 10 rewards points. The accumulated rewards points may be used by a merchant or advertiser as payment towards one or more advertising campaigns on the applications 111.

In some implementations, the application server 130 may include a routing engine/data 132 to provide information regarding travel times, routing and alerts. As will be described below, the application 111 may use, e.g., a Google Maps API to find the location of points of interest (POI) on a map, create routes between points of interest or obtain turn-by-turn driving directions for routes requested. The routing engine/data 132 may alert a user of the estimated travel time between their current location and any location that is tied to day of travel to a meeting arranged as stored in, e.g., the itinerary data 171. A routing function may search internal and external sources for location matches to user provided search criteria (physical address or place name), route using saved locations from user favorites or from "temporary" locations captured as part of user's current itinerary, provide "fastest" route in the form of a map or driving directions between user selected points of interest and/or user location (GPS), or provide trip time or time of arrival estimates to user or users sharing a common destination. An alerting function may check the subscribers account for current day travel or event activity, track flight departure times on day of travel to issue "must leave now" warnings tied to trip time from user's current location, track estimated arrival times for individuals or groups to shared destinations on day of event and inform the user if a faster alternate route is detected.

In some implementations, the application server 130 may include settlement data 134. In accordance with implementations herein, a settlement activity report may be used to initiate a periodic automated clearing house (ACH) transaction with advertisers. For example, net advertising revenue may be calculated after rewards expenses for a particular period for each advertiser or merchant affiliated with the application 111 within the environment 100.

In some implementations, the application server 130 may include administrative engine/data 136. Through an administrative interface, various administrative functions may be performed, such as modifying user account profile, managing a point value table, editing airport concession information, updating a user's rewards points bank, modifying an advertiser account profile, reviewing ad creatives uploaded by advertisers, modifying campaign criteria and/or modifying rewards offers.

In some implementations, the application server 130 may include an analytics function 138. The application server 130 may determine and analyze subscriber usage, ad serving, rewards accrual and redemption activity, settlement activity, behavior patterns of subscribers and behavior patterns of anonymous mobile users. The analysis may be fed back to the advertisers to determine what campaigns are effective.

Figure 2:
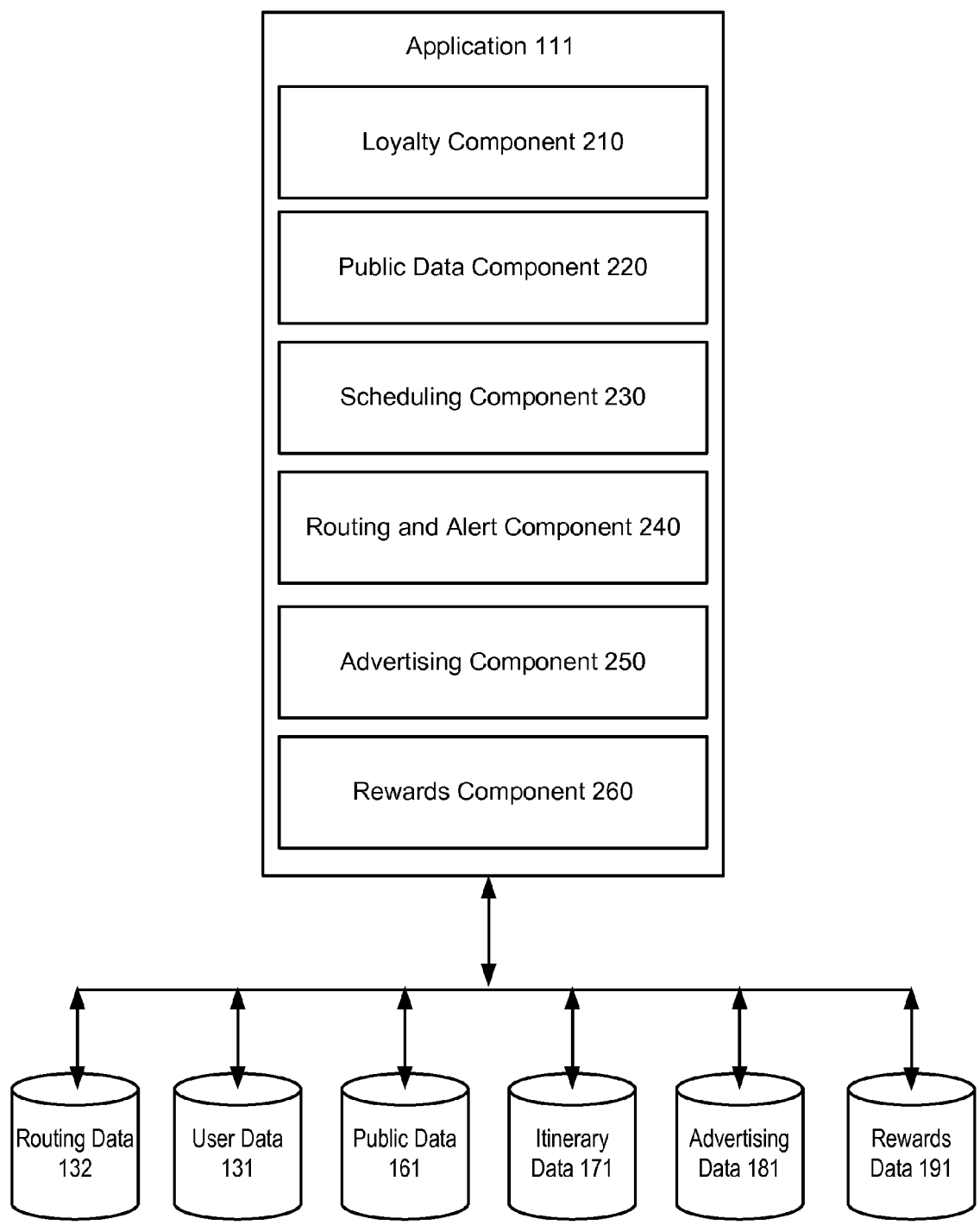
FIG. 2 is a block diagram of an implementation of an example application.

FIG. 2 is a block diagram of an implementation of an example application 111. As illustrated, in an implementation, the application 111 includes several components including, a loyalty component 210, a public data component 220, a scheduling component 230, a routing and alert component 240, an advertising component 250, and a rewards component 260. However, the application 111 may support more or fewer components that those illustrated. The application 111 may also access data directly and/or indirectly from the routing data/engine 132, user data 131, the public data 161, the itinerary data 171, the advertising data 181, and the rewards data 191. Moreover, while the components above are illustrated as part of the application 111, in some implementations, some or all of the components may be implemented in the application server 130.

The loyalty component 210 may aggregate itinerary data 171 associated with a user, and generate an itinerary for a user using the aggregated itinerary data 171. The generated itinerary may then be made available to the user at the application 111. As described previously, a user may have specified credentials such as a user ID and/or password information for a variety of loyalty programs. The loyalty component 210 may retrieve the credential information associated with the user from the user data 131, and may use the credential information to connect to one or more third party loyalty servers 170 associated with the credential information. The loyalty component 210 may then retrieve the itinerary data 171 from the various third party loyalty servers 170 and aggregate the itinerary data 171 to generate one or more itineraries for the user. The generated itineraries may then be stored for the user in the user data 131, or may be displayed to the user or saved for the user to view at a later time. An itinerary may include one or more events and each event may have an associated time and location. The events in an itinerary may also have an order such as chronological. Other ordering systems may also be used.

In some implementations, the itineraries may be continuously generated by the loyalty component 210. For example, the loyalty component 210 may poll the third party loyalty severs 170 at regular intervals and update one or more itineraries as new loyalty data 171 is discovered. In other implementations, the loyalty component 210 may generate an itinerary at the request of the application 111. For example, a user of the application 111 may select a user interface element displayed by the application 111 to request that an itinerary be generated.

In some implementations, the user may edit one or more of the itineraries generated by the loyalty component 210. In particular, a user may manually add or remove one or more events in an itinerary generated by the loyalty component 210. For example, a user may remove a hotel reservation that was added to an itinerary, or correct flight information that was incorrectly retrieved by the loyalty component 210. The user may edit the itinerary using a user interface provided by the application 111.

The application 111 may further include a public data component 220. The public data component 220 may access and aggregate public data 161 from one or more of the public data servers 160. The aggregated public data 161 may then be provided to a user or stored along with a generated itinerary. Examples of the public data include airport departure and arrival schedules, local traffic information, and or local address and phone number information, for example.

In some implementations, the public data 161 that is collected by the public data component 220 may be related to the data in the generated itinerary. The public data component 220 may process the itinerary to determine what public data 161 to retrieve. For example, if the itinerary indicates that the user is scheduled to depart on a flight from the Atlanta airport, the public data component 161 may collect public data 161 related to the Atlanta airport such as the address of the Atlanta airport, estimated security wait time, the estimated departure time of the flight associated with the user, and traffic congestion information for highways adjacent to the Atlanta airport. The collected public data 161 may then be displayed to the user adjacent to relevant items in the itinerary by the application 111 on the computing device 110.

The application 111 may further include a scheduling component 230. In some implementations, the scheduling component 230 may allow a user to create one or more scheduled events. The scheduled one or more events may be added to one or more itineraries associated with the user by the scheduling component 230. Examples of events may include travel arrangements such as hotel stays or airline reservations that may not be associated with the loyalty data 171 and therefore may not have been added to an itinerary by the loyalty component 210. Other examples include lunch or dinner reservations.

In some implementations, the scheduling component 230 may allow the user to create events, and to invite other users to attend a scheduled event. For example, the events may be meetings and the user may create meetings and invite users to attend the meetings. The users may be identified using email addresses, or where the users are also users of the application 111, by their user identifiers. In some implementations, the scheduling component 230 may interface with stored contacts associated with user on the computing device 110, or contacts associated with the user at a remote server, such as a Microsoft Exchange Server, for example. The user may then use the scheduling component 230 to select the contact that the user would like to invite to the event. The scheduling component 230 may then generate and send invites to the event to the selected contacts.

The application 111 may further include a routing and alert component 240. In some implementations, the routing and alert component 240 may provide various services to a user of the application 111 based on the location of the computing device 110. The location of the computing device 110 may be provided to the routing and alert component 240 by the locator 113, for example. In some implementations, the routing and alert component 240 may interface with one or more mapping services and/or applications (e.g., Google maps) and/or the routing data/engine 132 to provide location based services such as providing driving directions between a current location and a desired destination. Other location based services may include estimated time of arrival ("ETA") calculation between a current location and a desired location, mapping and ETA estimation using one or more specified travel means (e.g., walking, driving, biking, and public transportation), and mapping and ETA calculations that takes into account local traffic conditions. The local traffic conditions may be supplied by the particular mapping service, or may be part of the public data 161, for example.

In some implementations, the routing and alert component 240 may provide one or more location based services according to the events in a generated itinerary. For example, if an itinerary associated with a user indicates that the user is scheduled to take a flight out of a local airport, the routing and alert component 240 may generate a map that displays a driving route between a current location of the locator 113 and the local airport. Alternatively, or additionally, the routing and alert component 240 may recommend a route that uses public transportation or walking, or a combination of driving, walking, and public transportation, for example.

In some implementations, the routing and alert component 240 may allow a user to search for businesses or other locations near a current location of the user. For example, a user may request the location of a coffee shop closest to the current location of the user, or to a location indicated by an itinerary such as a hotel that the user is staying at. The routing and alert component 240 may then provide the user with directions to the closest coffee shop.

The routing and alert component 240 may further provide one or more alerts to the user based on the itinerary associated with the user and the current location of the user. For example, if the itinerary of the user indicates that the user has a scheduled meeting at a particular location, the routing and alert component 240 may provide an alert to the user using a notification service of the computing device 111. Alternatively or additionally, the routing and alert component 240 may provide a map or driving direction to the particular location.

In some implementations, the routing and alert component 240 may use the public data 161 and the data in one or more of the itineraries to determine when to provide an alert and/or routing information. For example, an itinerary may indicate the user has a flight that leaves in 5 hours. However, based on the location of the user, and the projected security wait lines at the airport and traffic conditions indicated by the public data 161, the routing and alert component 240 may provide an alert to the user that the user should consider leaving from their current location early to make their scheduled flight.

In some implementation, the routing and alert component 240 may determine a location of a next event on the user itinerary, and determine an amount of time required to get to the event from the current location of the user. If the time required to get to the next event is less than the time associated with the next event minus the current time and a threshold time, then the routing an alert component 240 may recommend that the user leave for the event. The threshold time may be set by a user or administrator and may act as a cushion or hedge incase the time required to get to the next event is incorrect.

The application 111 may further include an advertising component 250. The advertising component 250 may select and display one or more advertisements to users of the application 111. The advertisements may be selected from one or more advertisement in the advertising data 181. The advertisements may include a variety of advertisements such as image and video based advertisements in a variety of sizes and resolutions.

In some implementations, the advertisements may be selected for display by the advertising component 250 according to one or more advertising campaigns. As described previously, one or more advertisers may generate advertising campaigns that specify how one or more advertisements associated with the campaign are to be displayed by the advertising component 250. For example, a campaign may specify keywords that may trigger the display of an advertisement or a location as indicated by the routing and alert component 240 that may trigger the display of an advertisement. If the specified words appear in an itinerary associated with the user then the advertisements associated with the campaign may be displayed to the user.

Advertising campaigns may also use location based criteria. For example, in some implementations, an advertising campaign may include a location based criteria that an advertisement be displayed to a user when the user is within a specified distance from a particular location (e.g., in front of a store or a competitor's store). The advertising component 250 may then use the routing and alert component 240 to determine when a location based criteria has been met, and may display the advertisement associated with the campaign from the advertising data 181 to the user.

The advertisements may be displayed to the user in a user interface of the application 110 by the advertising component 240. The user may interact with the displayed advertisements. For example, a user may select a displayed advertisements and the advertising component 240 may direct the user to a webpage associated with the advertisement by opening a browser window at computing device 110. Where the selected advertisement is a retailer, the advertising component 240 may use the routing alert component 240 to provide locations of the retailer on a map along with driving directions to the user.

The advertising component 240 may further monitor and account for advertisements displayed through the application 111 as well as advertisements selected or interacted with by the user. The collected information may be used to charge the advertiser or merchant associated with each advertisement. For example, as part of an advertising campaign an advertiser or merchant may agree to a charge for each advertisement displayed or selected by users through the application 111. The number of advertisements selected and viewed for each merchant or advertisement may be periodically provided by the advertising component 240 to the application server 130 for accounting purposes.

The application 111 may further include a rewards component 260. The rewards component 260 may manage the earning and redemption of one or more rewards by a user. In some implementations, a reward may be non-cash based points that users can accumulate through usage of the application 111. The total reward points accumulated by a user may be stored in the rewards data 191.

In some implementations, a user may accumulate reward points through usage of the application 111. For example, a user may receive some number of reward points every time the user activates the application 111 on their computing device 110. In addition, the user may receive further reward points for interacting with specific functions or features of the application 111. For example, a user may receive some number of reward points for scheduling a meeting through the application 111 with the scheduling component 230, or for using the routing and alert component 230 to provide directions to a hotel.

In some implementations, the reward points may be accrued the first time the user uses a particular feature, or every time the user the user uses a particular feature. The amount of reward points the user may accrue for using a particular feature may be the same each time, or may increase with continued usage. For example, a user may receive 10 reward points for the first 50 meetings they schedule through the scheduling component 230, and 20 reward points for the subsequent 50 meetings they schedule through the scheduling component 230. In addition, the amount of rewards a user may accrue may be increased during promotions or during off peak time periods, or may capped at some value, for example.

As described above, the rewards component 260 may further manage the redemption, or usage, of the accumulated reward points. In some implementations, a user of the application 111 may select a user interface element corresponding to rewards and may be presented with the total amount of reward points earned so far, along with a list of one or more reward items that may be exchanged for reward points. For example, the user may select items such as gift certificates or coupons for one or more restaurants, hotels, rental car companies or other goods and services. Indicators of the reward items that the user may select in exchange for reward point may be stored in the rewards data 191, for example.

In some implementations, the items offered for exchange for the reward points to the user may be provided by one or more advertisers. Similarly to the advertising campaigns described above, the advertisers may provide one or more rewards campaigns that specify criteria on how and when the reward items are presented to users. The criteria may be location criteria or other criteria such as demographic of keyword criteria. The rewards component 260 may then offer items to users in exchange for reward points when the criteria associated with a rewards campaign are satisfied.

For example, an advertiser may create a campaign where a user may redeem some number of reward points for a $10 off gift certificate to their restaurant when the user satisfies a location based criteria that the user is within five miles of their restaurant. Thus, when the routing and alert component 240 determines that the user is within five miles of the restaurant, the user may be offered the gift certificate by the rewards component 260 in exchange for some number of reward points. The user may be offered the gift certificate after the user selects the user interface element corresponding to rewards described above, or in some implementations, the user may receive a notification such as a "popup" or a text notification that the reward is now available to the user, for example.

In another example, an advertiser may create a rewards campaign where rewards are presented to a user based on an itinerary associated with the user. As described above, the loyalty component 210 may generate one or more itineraries for a user based on itinerary data 171 retrieved from one or more third party loyalty servers 170. An advertiser of particular product or service such as a rental car company may specify that a coupon of gift certificate for the rental car company be offered to a user when the user's itinerary data includes a competitor of the rental car company.

In some implementations, when the user redeems reward points on a particular offer, the rewards component 260 may debit the reward points associated with the user in the rewards data 191 and provide the offer to the user. In addition, the rewards component 260 may credit the merchant or advertiser associated with the offer with the reward points redeemed by the user. The rewards points may then be credited against the advertising budget of the merchant or advertiser by the rewards component 260.

Where the offer is coupon or gift certificate, the offer may be provided to the user in a variety of ways. In one implementation, the offer may be mailed a physical address associated with the user, or emailed to an email address associated with the user. The user may then present the offer to a merchant associated with the offer, for example. In another implementation, the user may be taken to a webpage associated with the merchant (using a browser associated with the computing device 110), where the user may redeem the offer. In another implementation, the offer may be displayed on the computing device 110 associated with the user, and the user may present the offer to the merchant by showing the merchant the display of the computing device 110. For example, the offer may have a barcode or other machine readable marking that the merchant can scan on the display of the computing device 110.

In some implementations, in order to prevent fraudulent usage of the rewards offered by the application 111, one or more security measures may be taken by the rewards component 260 to validate or authenticate the reward item redemption by the user. One example of such a validation may be to require the user to enter a code corresponding to a code that is displayed in an image. If the user provided the correct code, the rewards component 260 may provide the user with the rewards item.

Figure 3:
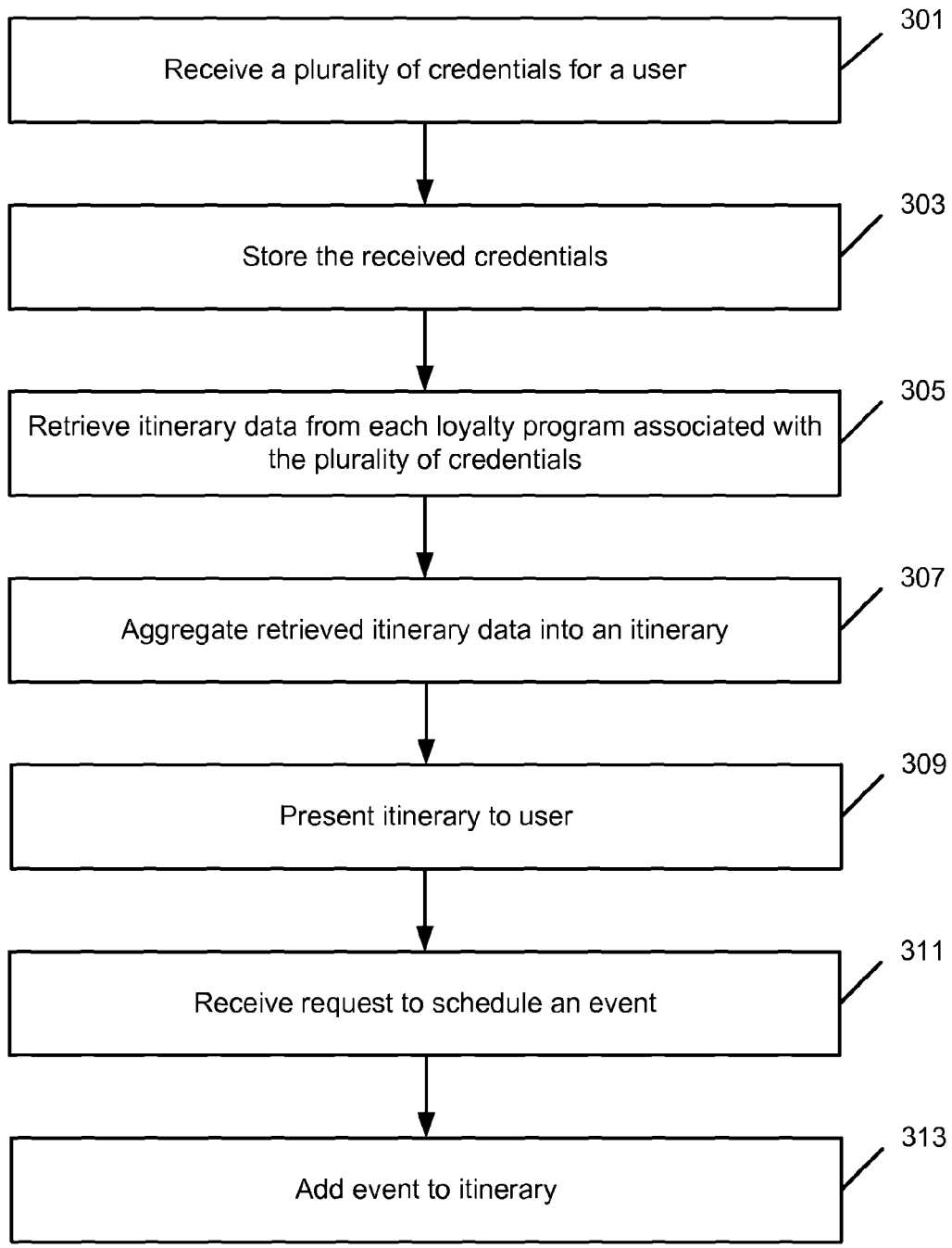
FIG. 3 is an operational flow of an implementation of a method for aggregating an itinerary for a user from itinerary data.

FIG. 3 is an operational flow of an implementation of a method 300 for aggregating an itinerary for a user from itinerary data. The method 300 may be performed by an application 111 of a computing device 110.

A plurality of credentials is received for a user (301). The plurality of credentials may be received from the user by an application 111. In some implementations, the credentials may include user names and passwords for user accounts with one or more loyalty programs. The loyalty programs may include programs such as airline frequent flyer programs, rental car reward programs, and hotel reward programs. Other types of loyalty programs may be included.

The received credentials are stored (303). The received credentials may be stored with the user data 131 at the application 111. Alternatively or additionally, the received credentials may be stored with the user data 131 at the application server 130.

Itinerary data is retrieved from loyalty programs associated with the plurality of credentials (305). The itinerary data 171 may be retrieved from one or more third party loyalty servers 170 using the credentials by the loyalty component 210 of the application 111. Alternatively or additionally, the application server 130 may retrieve the itinerary data 171. The itinerary data 171 for each third party loyalty server 170 may include data such as reservations made by the user through the respective loyalty programs. For example, the third party loyalty server 170 may be associated with an airline frequent flyer program and the itinerary data 171 may therefore include scheduled departure and arrival flights for the user.

In some implementations, the loyalty component 210 may periodically retrieve the itinerary data 171 from the third party loyalty servers 170. Alternatively or additionally, the loyalty component 210 may retrieve the itinerary data 171 when requested by the user. For example, the user may select a user interface element of the application 111 that causes the loyalty component 210 to retrieve the itinerary data 171.

The itinerary data is aggregated into an itinerary for the user (307). The itinerary data may be aggregated into an itinerary by the loyalty component 210. The itinerary may include a plurality of scheduled events for the user aggregated from the itinerary data. The events may include flight reservations, rental car reservations, restaurant reservations, and hotel reservations, for example. The itinerary may be organized in an order such as chronological. Other types of ordering may be used.

The itinerary may be presented to the user (309). The itinerary may be presented to the user on a display of the computing device 110 by the loyalty component 210 of the application 111. Alternatively or additionally, the itinerary may be emailed to the user, emailed to one or more contacts associated with the user, or stored for later viewing by the user.

A request is received from the user to schedule an event (311). The request may be received from the user by the scheduling component 230 of the application 111. In some implementations, the event may be a meeting.

The event is added to the itinerary (313). The event may be added by the scheduling component 230 of the application 111. The event may be added to the itinerary in chronological order with respect to the other events in the itinerary.

Figure 4:
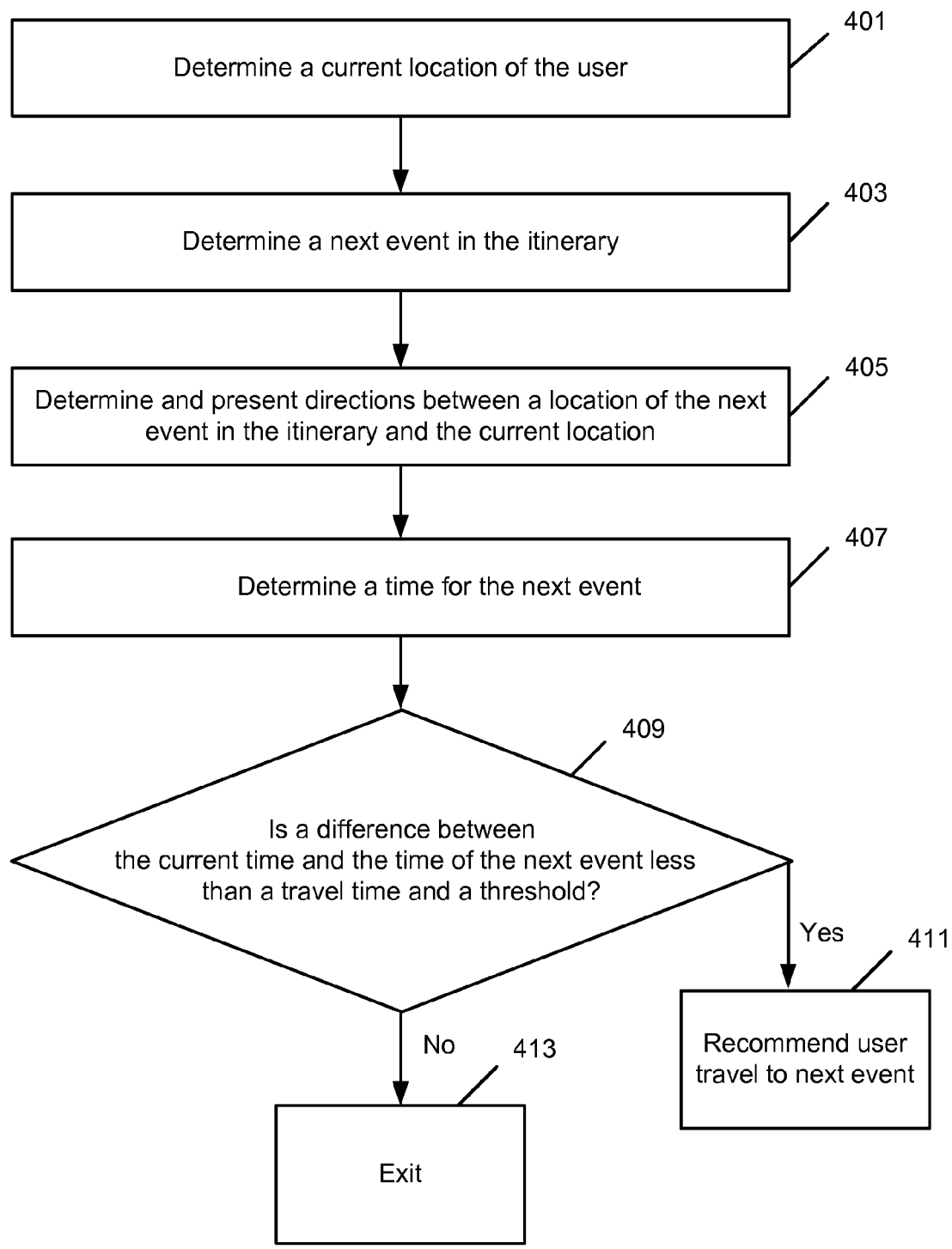
FIG. 4 is an operational flow of an implementation of a method for providing directions to a user for a scheduled event and alerting a user of an upcoming scheduled event.

FIG. 4 is an operational flow of an implementation of a method 400 for providing directions to a user for a scheduled next event and alerting the user of an upcoming scheduled next event. The method 400 may be implemented by the routing and alert component 240 of the application 111.

A current location of the user is determined (401). The current location of the user may be determined by the routing and alert component 240 of the application 111. In some implementations, the routing and alert component 240 may determine the location of the user using a locator 113 of the computing device 110. For example, the locator 113 may use GPS or other location aware technology.

A next event in the itinerary is determined (403). The next event may be determined by the routing and alert component 240 of the application 111 according to the chronological order of the events in the itinerary.

Directions between a location of the next event in the itinerary and the current location are determined (405). The directions may be determined by the routing and alert component 240 of the application 111. In some implementations, the directions may be determined using a mapping application or API such as Google Maps, for example. The directions may be driving directions, walking direction, biking direction, or public transportations, for example.

A time is determined for the next event (407). The time may be determined by the routing and alert component 240 of the application 111. The time may be a time when the event is scheduled to take place. For example, if the event is a meeting, the time may be the start time of the meeting, and if the event is a flight, the time may be the departure time for the flight.

A determination is made as to whether a difference between the current time and the time of the next event is less than a travel time to the next event and a threshold time (409). The determination may be made by the routing and alert component 240 of the application 111. As described above, the current location of the user and the location of the next event may be different; therefore, to ensure that the user is able to attend the scheduled event, the routing and alert component 240 may periodically determine if the user has enough time to travel to the next scheduled event, or any other event in the itinerary.

In some implementations, the routing and alert component 240 may use an estimated travel time associated with directions determined at 405 along with a threshold time. The threshold time may be set by a user or administrator and may account for unforeseen delays that the user may experience during traveling. The threshold time may be fixed, or may vary depending on the distance between the user and the next event. For example, with respect to distance, if the user is one mile from the next event, then the threshold time may be low because the user is unlikely to experience difficulties traveling one mile.

In addition, depending on the type of event, the determination may further include additional public data. For example, if the event is a flight, the determination may further account for expected security wait times of the airport and/or check in times for the airport. Similarly, other public data such as traffic conditions may also be considered. The public data may be determined by the public data component 220 of the application 111.

If the difference between the current time and the time of the next event is less than the travel time and a threshold time, then the method 400 may continue at 411 where a recommendation may be provided to the user to travel to the next event. Else, the method 400 may exit at 413.

A recommendation is provided to the user to travel to the next event (411). The recommendation may be provided to the user by the routing and alert component 240 of the application 111. The recommendation may be a message that displays on a display of the computing device 110, or an alarm that is played through a speaker of the computing device 110. Any system, method, or technique for providing a message or an alarm on a computing device may be used.

Figure 5A:
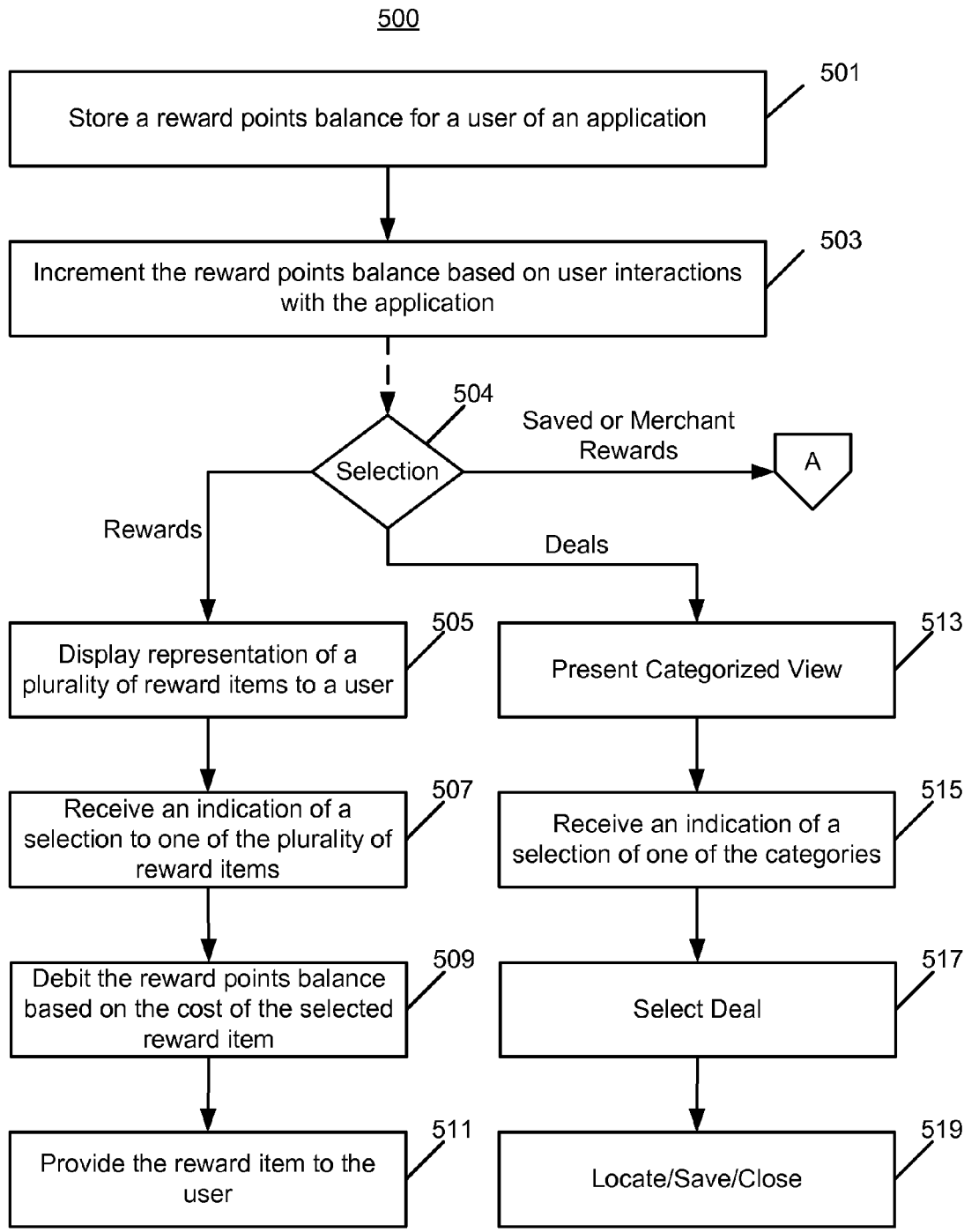
FIGS. 5A and 5B illustrate an operational flow of an implementation of a method for viewing and redeeming offers and reward points for items.
Figure 5B:
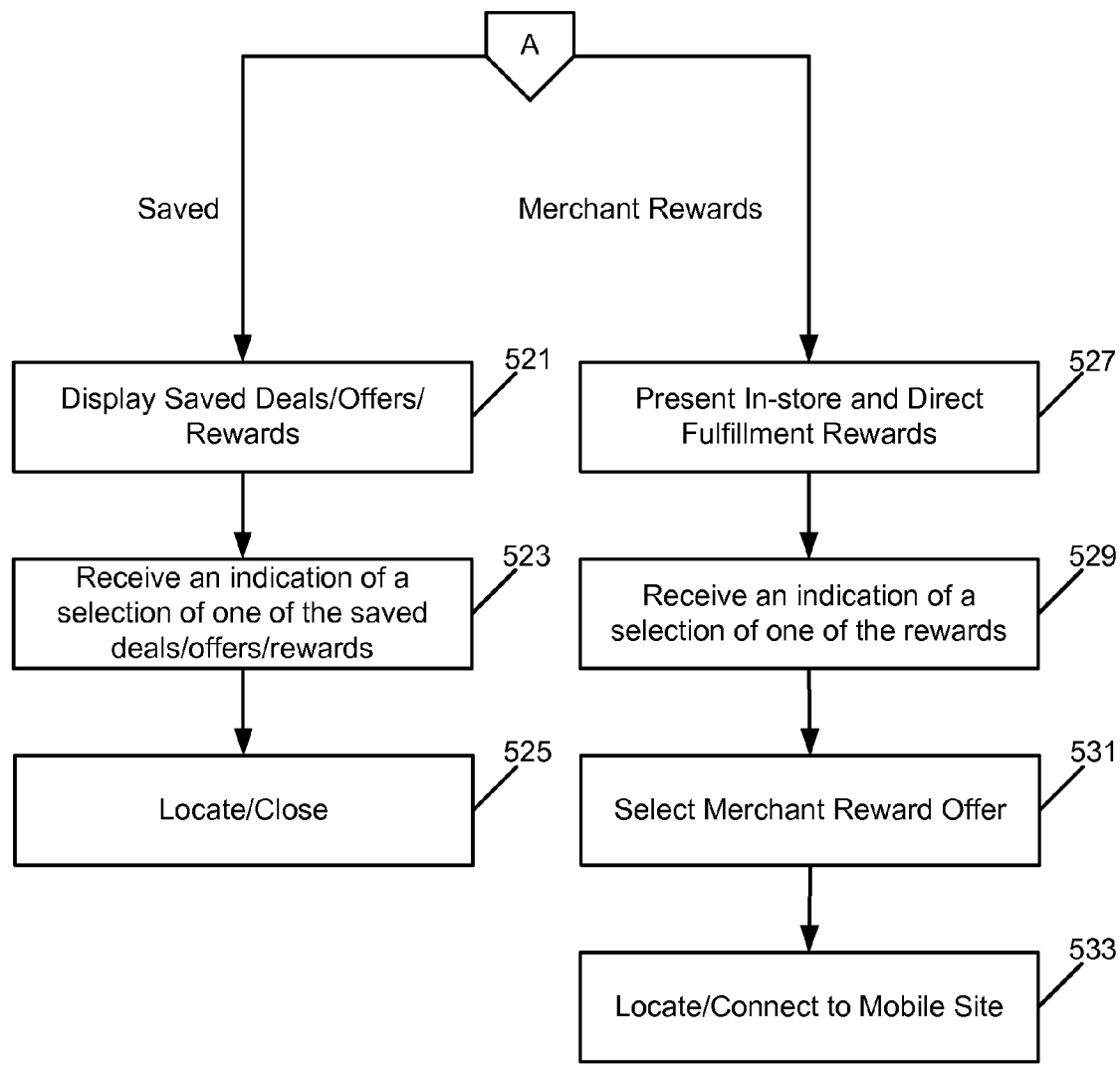

FIGS. 5A and 5B illustrate an operational flow of an implementation of a method 500 for viewing and redeeming offers and reward points for items. The method 500 may be implemented by the rewards component 260 of the application 111, for example.

A reward point balance is stored for a user of an application (501). The reward point balance may be stored for a user in the rewards data 191 by the rewards component 260 of the application 111. Alternatively or additionally, the reward point balance may be stored by the application server 130.

The reward point balance is incremented based on user interactions with the application (503). The rewards balance may be incremented by the rewards component 260 of the application 110. To encourage the user to interact with the application 111, the user may accrue reward points each time the user interacts with the application. For example, the user may accrue reward points each time the user started the application 111, views an itinerary, or schedules a meeting with the application 111. The user may also accrue reward points each time the user views or selects offers of merchants or advertisers affiliated with the application 111. The particular interactions with the application 111 that accrue reward points, as well as the amount of reward points accrued may be set by an administrator. The application 111 may provide an interface to various functions, such as rewards redemption, offers, etc.

In response to an input received from the user, the computing device may launch the application and a selection received from within the application (504). The application 111 may be launched on a user's mobile device and present a user interface in which icons, text, etc. maybe presented to indicate various options. The user may make a selection of one of the options that is received by the application 111. For example, if the user selects a "rewards" option, then representations of a plurality of reward items are displayed (505). The representations may be displayed by the rewards component 260 of the application 111. The representation may be graphics or text that describes each reward item and the price for the reward item in reward points. In some implementations, the reward items may be selected for display according to one or more reward campaigns. For example, a reward campaign may specify that a reward item only be offered when the user is within 50 feet of a merchant location, for example. Other criteria may also be used.

An indication of selection of one of plurality of reward items is received (507). The indication may be received by the rewards component 260 of the application 111. For example, the user may have selected the representation of the reward item on the display of the application 111.

The reward point balance is debited based on the cost of the selected reward item (509). The reward point balance may be debited by the rewards component 260 of the application 111. In addition, a rewards account associated with the merchant or advertiser associated with the selected reward item may be credited an amount equal to the redeemed reward points. The balance may then be credited against an advertising budget associated with the advertiser or merchant, for example.

The reward item is provided to the user (511). The reward item may be provided by the rewards component 260 of the application 111. In some implementations, the reward item may be emailed to the user, or displayed on the display of the computing device 110. Alternatively, the rewards component 260 may direct the user to a website associated with the reward item where the reward item may be redeemed.

Returning to 504, if the user makes a selection of "deals" then representations of a plurality of categories are provided (513). The categories of deals may be defined as, e.g., dining, shopping, travel, entertainment, services, other, etc., such that the user can easily navigate to a particular good/service of interest. An indication of a category is received (515). The indication may be received by the rewards component 260 of the application 111. For example, the user may select dining to seek out restaurant deals and the application 111 may present a listing of specific deals for review. The deals may be presented based on advertiser campaigns submitted to the advertising server 180 through an associated graphical user interface.

A selection of a deal is made (517). For example, the user may indicate that he/she is interested in Italian cuisine offered by a specific advertiser. The user may then locate the advertiser's restaurant, save the deal or close (519). Using the routing and alerting component 240 of the application 111, the location of the user may be used to find the closest restaurant and to provide directions and an estimated time of arrival. The user may save the deal for later retrieval (see, below) or close out the application.

Returning to 504, if the user makes a selection of "saved" then a user's saved deals/offers/rewards are presented (521; FIG. 5B). The application 111 may provide a listing of all saved deals/offers/rewards, together with an indication which saved deals/offers/rewards are active or expired. An indication of a saved deal/offer/reward is received (523). The indication may be received by the rewards component 260 of the application 111. For example, the user may select a saved entertainment offer.

The user may then locate the provider of the saved offer (525). Using the routing and alerting component 240 of the application 111, the location of the user may be used to find the closest provider establishment, and to provide directions and an estimated time of arrival.

Returning to 504, if the user makes a selection of "merchant rewards" then representations of a plurality of in-store and direct fulfillment rewards are provided (527; FIG. 5B). The merchant rewards may be offered by merchants who have a relationship with the provider of the application 111. An indication of a type of reward is received (529). The indication may be received by the rewards component 260 of the application 111. For example, the user may select in-store merchant rewards.

A selection of a merchant reward is made (531). For example, the user may indicate that he/she is interested in a one day special offered by the merchant. The user may then locate the merchant's store or connect to mobile site (533). Using the routing and alerting component 240 of the application 111, the location of the user may be used to find the closest merchant store and to provide directions and an estimated time of arrival. If the user selected a direct fulfillment reward, the application 111 may spawn a browser instance on the computing device and the user may shop at the merchant's website.

Figure 6:
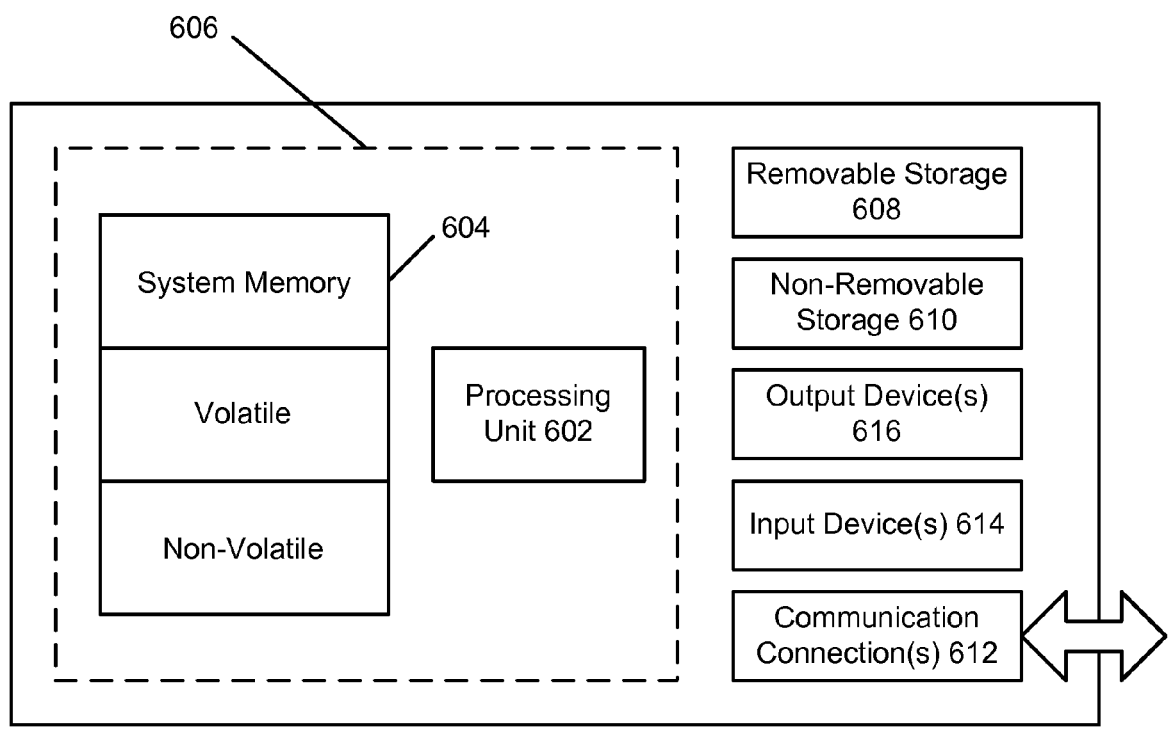
FIG. 6 is a block diagram of a computing system environment according to an implementation of the present system.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/ functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   retrieving a plurality of credentials for a user by a computing device, wherein each of the plurality of credentials is associated with a respective loyalty program;
   retrieving first itinerary data from a server associated with a first loyalty program using the credentials associated with the first loyalty program from the plurality of credentials, wherein the first itinerary data corresponds to a product or service offered by a first vendor;
   retrieving second itinerary data from a server associated with a second loyalty program using the credentials associated with the second loyalty program from the plurality of credentials, wherein the second itinerary data corresponds to a product or service offered by a second vendor;

aggregating the retrieved first and second itinerary data for each respective loyalty program into an itinerary, wherein each respective loyalty program is different loyalty program;

receiving a request from the user to schedule an event;

adding the event to the itinerary; and presenting the itinerary to the user at the computing device.

2. A system for managing electronic delivery and redemption of customer loyalty rewards, comprising:

a processor configured to execute an application, the application comprising:

a loyalty module configured to:

retrieve a plurality of credentials for a user by a computing device, wherein each of the plurality of credentials is associated with a respective loyalty program;

retrieve first itinerary data from a server associated with a first loyalty program using the credentials associated with the first loyalty program from the plurality of credentials, wherein the first itinerary data corresponds to a product or service offered by a first vendor;

retrieve second itinerary data from a server associated with a second loyalty program using the credentials associated with the second loyalty program from the plurality of credentials, wherein the second itinerary data corresponds to a product or service offered by a second vendor;

aggregate the retrieved first and second itinerary data for each respective loyalty program into an itinerary, wherein each respective loyalty program is a different loyalty program;

a scheduling module configured to:

receiving a request from the user to schedule an event;

adding the event to the itinerary; and a display configured to present the itinerary to the user.

3. The method of claim 1, wherein the itinerary comprises a plurality of events in an order and each event comprises a time and a location, and further comprising:

determining a current location of the user;

determining a next event in the itinerary according to the order;

determining directions from the current location to the location of the next event; and presenting the directions to the user.

4. The method of claim 3, further comprising:

determining the time of the next event;

estimating a travel time for the user to travel to the location of the next event from the current location; and if the difference between the time of the next event and a current time is less than a sum of the travel time and a threshold time, recommending that the user travel to the next event.

5. The method of claim 1, further comprising:

determining a current location of the user;

if the current location of the user satisfies at least one location criteria of an advertising campaign; and if so, displaying an advertisement to the user.

6. The method of claim 1, further comprising:

retrieving indicators of a plurality of reward items;

displaying representations of the plurality of reward items to the user, wherein each reward item has an associated cost in reward points;

receiving an indication of a selection of one of the plurality of reward items;

retrieving a reward points balance associated with the user;

debiting the reward points balance associated with the user by the cost associated with the selected reward item; and providing the reward item to the user.

7. The method of claim 6, wherein providing the reward item to the user comprises retrieving an email address associated with the user and emailing the reward item to the user at the retrieved email address.

8. The method of claim 6, wherein the reward item is one of a coupon and a gift certificate.

9. The method of claim 6, wherein providing the reward item to the user comprises displaying a representation of the reward item on a display of the computing device, wherein the representation includes a machine readable graphic that may be presented to a merchant associated with the reward item to facilitate redemption of the reward item by the user.

10. The method of claim 1, wherein the computing device is one of a cellular phone, a smart phone, laptop computer, and a tablet computer.

11. The system of claim 2, wherein the system is one of a cellular phone, a smart phone, laptop computer, and a tablet computer.

12. The system of claim 2, wherein the itinerary comprises a plurality of events in an order and each event comprises a time and a location, and wherein the application further comprising:

a routing component configured to:

determine a current location of the user;

determine a next event in the itinerary according to the order;

determine directions from the current location to the location of the next event; and provide information for causing display of the directions.

13. The system of claim 12, wherein the routing component is further configured to:

determine the time of the next event;

estimate a travel time for the user to travel to the location of the next event from the current location; and if the difference between the time of the next event and a current time is less than a sum of the travel time and a threshold time, provide a signal indicative of a recommendation that the user travel to the next event.

14. The system of claim 2, wherein the application further comprises:

a routing component configured to determine a current location of the user;

an advertising component configured to:

determine that the current location satisfies at least one location criteria of an advertising campaign; and provide information for causing display of an advertisement.

15. The system of claim 2, wherein the application further comprises:

a rewards component configured to:

retrieve indicators of a plurality of reward items;

provide information for causing display of representations of the plurality of reward items to the user, wherein each reward item has an associated cost in reward points;

receive an indication of a selection of one of the plurality of reward items;

retrieve a reward points balance associated with the user;

debit the reward points balance associated with the user by the cost associated with the selected reward item; and providing information for causing delivery of the reward item to the user.

16. The system of claim 15, wherein providing the reward item to the user comprises emailing the reward item to the user at the retrieved email address.

17. The system of claim 15, wherein the reward item is one of a coupon and a gift certificate.

18. The system of claim 15, wherein providing information for causing delivery of the reward item to the user comprises providing information for causing display of a representation of the reward item on a display of the computing device, wherein the representation includes a machine readable graphic that may be presented to a merchant associated with the reward item to facilitate redemption of the reward item by the user.

\* \* \* \* \*